W. D. NICKUM.
ELECTRICAL WATER LEVEL INDICATING APPARATUS.
APPLICATION FILED SEPT. 16, 1918.

1,388,479.

Patented Aug. 23, 1921.
7 SHEETS—SHEET 1.

INVENTOR
Walter D. Nickum
BY
Arthur P. Knight
his ATTORNEY

W. D. NICKUM.
ELECTRICAL WATER LEVEL INDICATING APPARATUS.
APPLICATION FILED SEPT. 16, 1918.

1,388,479.

Patented Aug. 23, 1921.
7 SHEETS—SHEET 2.

INVENTOR
Walter D. Nickum
BY
Arthur P. Knight
His ATTORNEY

W. D. NICKUM.
ELECTRICAL WATER LEVEL INDICATING APPARATUS.
APPLICATION FILED SEPT. 16, 1918.

1,388,479.

Patented Aug. 23, 1921.
7 SHEETS—SHEET 3.

INVENTOR
Walter D. Nickum
BY
Arthur P. Knight
his ATTORNEY

W. D. NICKUM.
ELECTRICAL WATER LEVEL INDICATING APPARATUS.
APPLICATION FILED SEPT. 16, 1918.

1,388,479.

Patented Aug. 23, 1921.
7 SHEETS—SHEET 5.

INVENTOR
Walter D. Nickum
BY
Arthur P. Knight
his ATTORNEY

W. D. NICKUM.
ELECTRICAL WATER LEVEL INDICATING APPARATUS.
APPLICATION FILED SEPT. 16, 1918.

1,388,479.

Patented Aug. 23, 1921.
7 SHEETS—SHEET 7.

FIG.-21.

INVENTOR
Walter D. Nickum
BY
Arthur P. Knight
his ATTORNEY

UNITED STATES PATENT OFFICE.

WALTER D. NICKUM, OF GLENDALE, CALIFORNIA.

ELECTRICAL WATER-LEVEL-INDICATING APPARATUS.

1,388,479.

Specification of Letters Patent.  Patented Aug. 23, 1921.

Application filed September 16, 1918. Serial No. 254,345.

*To all whom it may concern:*

Be it known that I, WALTER DANIEL NICKUM, a citizen of the United States of America, residing at Glendale, in the county of Los Angeles and State of California, have invented a new and useful Improvement in Electrical Water-Level-Indicating Apparatus, of which the following is a specification.

This invention relates primarily to means for giving indication and alarm by electrical means upon occurrence of low water in boilers, reservoirs, etc., and the main object of the invention is to provide means for this purpose which will utilize the water itself as the circuit controlling medium, between electrodes immersed therein, and will operate with certainty and accuracy.

Reference is made, in connection with this application, to my application Serial Number 275,860, filed February 8, 1919, for improvements in electrolytic apparatus and method of depolarizing the same; application Serial Number 330,392, filed October 13, 1919, for improvements in electrodes for electrical water level indicating apparatus, and application Serial Number 375,502, filed April 21, 1920, for improvements in electrolytic apparatus and methods of depolarizing the same.

An important object of the present invention is to avoid difficulties which have been found to arise in apparatus of this class by reason of so-called "polarization" at the circuit controlling electrodes, causing decrease or even practical cessation of the operating current under conditions at which the current should be maintained at full strength.

When plates of two dissimilar metals are partly immersed in a vessel containing an acidulated solution, and their outer ends are connected together by a conducting wire, an electric current is set up, caused by the acid in the solution attacking the metal plates. The water of the solution is also acted upon and free oxygen and hydrogen gases are liberated. The gases collect on the metal plates, partly adhering thereto, and form a film of high electrical resistance, causing a rapid decrease if not an actual stoppage of the electrical action. This effect of polarization is a well known action in practically all chemical batteries.

It is also well known that when an electric current is caused to pass through an acidulated solution between electrodes immersed therein, a deterrent film of gas is formed on the electrodes due to the electrolysis of the water, and as these gases are poor conductors the current is practically stopped. If a coil of wire wound around a soft iron core is introduced into the circuit, a high voltage induced current will surge through the circuit and break the gas film when the primary current has been stopped by the collecting of the deterrent gases on the electrodes, again establishing a path for the primary current. This forming and disrupting of the gas film is very rapid and has been taken advantage of in designing certain well known types of electrolytic interrupters but has the disadvantage of being of little value on currents having a potential of less than 40 or 50 volts.

The present invention provides a method of maintaining a constant flow of low voltage current between plates or electrodes immersed in water or other electrolyte, by constantly dissipating the deterrent gas film formed by electrolysis of the water. This is effected by taking advantage of the relatively higher voltage currents induced in the secondary windings of induction coils or transformers when the primary current is varied by polarization, to break down the gas film. I have found that under suitable conditions with a properly designed induction coil or transformer the current may, by this means, be indefinitely maintained at proper value through the circuit, even with a potential difference as low as one and one-half volt.

Another object of the invention is to provide the indicating apparatus with means for indicating whether it is in operative condition.

A further object of the invention is to provide a water level signal apparatus with means for cautionary, as well as danger, signals, and with tell-tale means operative on occurrence of the danger signal to serve as a check on the operator.

Another object of the invention is to provide an improved construction of the electrode means for establishing circuit through the water.

Other objects of the invention will appear hereinafter.

The accompanying drawings illustrate embodiments of my invention, and referring thereto:

Fig. 15 is a side elevation and Fig. 16 an end view of an electrode tube.

Fig. 17 and Fig. 18 are sections on line d—d in Fig. 15, respectively at the left and right ends thereof.

Figure 3:
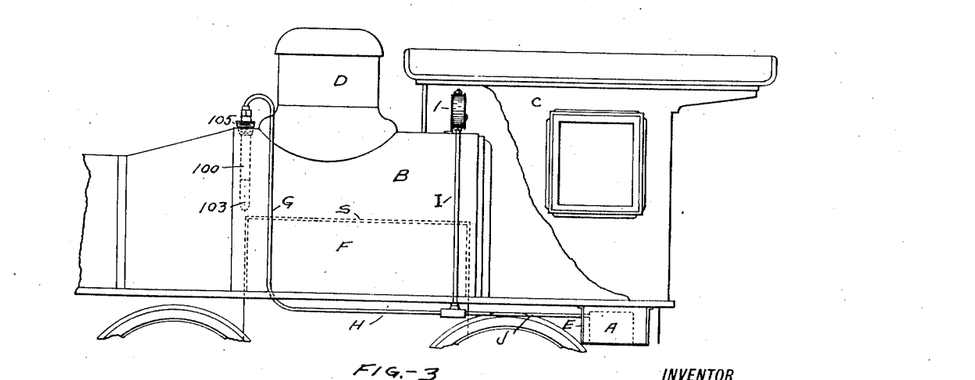
Fig. 3 is a side elevation of part of a locomotive showing the application of my invention thereto.

In applying my invention to a locomotive boiler, I prefer to use the equipment shown in Fig. 3 consisting of the signal box 1, electrode tube 100, battery A and connecting conduits G, H, I and J protecting the interconnecting wires.

In the illustration the battery A is inclosed in a box E suitably attached under the overhanging portion of the floor of the cab C. The impedance coils of any suitable design and the cut-off switch are preferably mounted in the box E with the battery A. The signal box 1 containing the signals and operating mechanism is suitably mounted by a bracket or other means on the top or rear end of that portion of the boiler B protruding into the cab C, and when possible is mounted either in close proximity to the steam gage or water glass or in such a position as to be readily seen by both the engineer and fireman. The electrode tube 100 is preferably placed just in front of the steam dome D and is mounted in as near a vertical position and as near the center of the top of the boiler B as the dry steam pipes and other appliances in the boiler B will permit, and in such a position that the shell end 103 of the tube 100 will be immediately over the front end of the top or crown sheet S of fire-box F. It is rigidly held in position by the taper threaded head 105 engaging similar threads in a tapered hole in the boiler shell.

Figures 15, 16, 17:
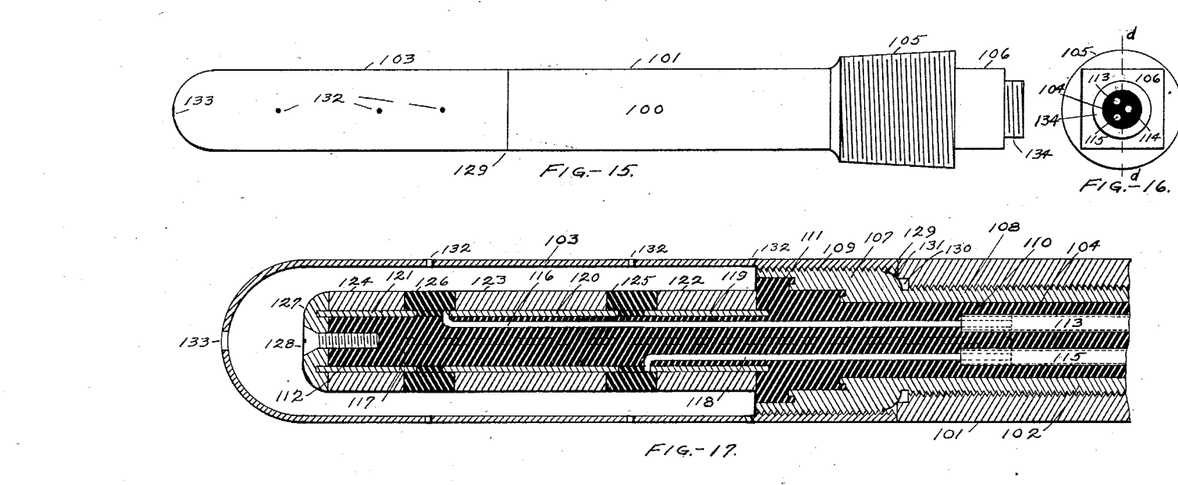
Figure 18:
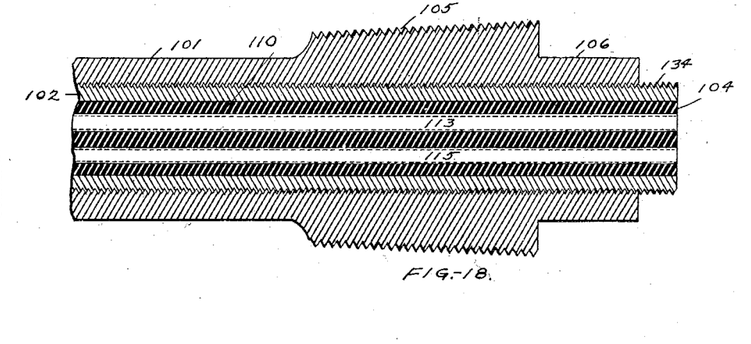
Figure 20:
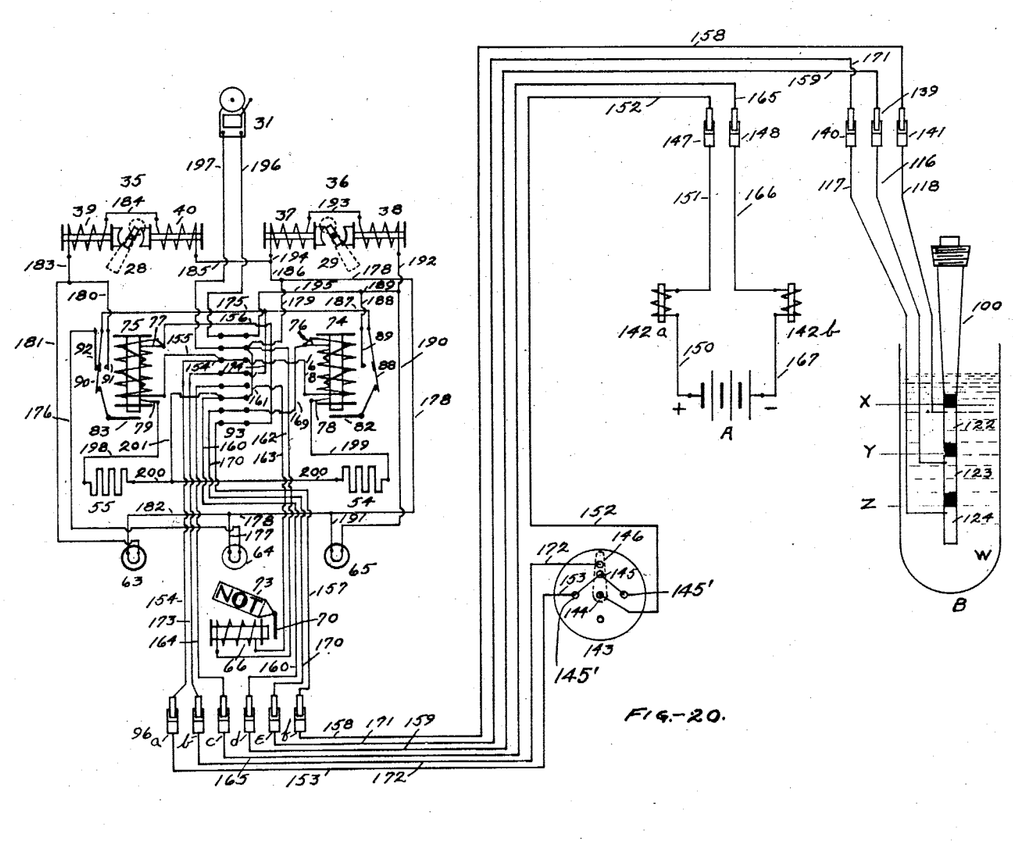
Fig. 20 is a diagram of the circuit connections suitable for a locomotive boiler alarm.

Electrode tube 100 incloses electrodes 122, 123 and 124, Fig. 17, which should be immersed to such a depth that when the water has receded to where the contact is broken between electrodes 123 and 124, Fig. 20, and the danger signal is indicated on the signal box 1, a sufficient depth of water will remain over the crown sheet S of fire-box F to prevent damage while the water level is being restored.

Figures 12, 13, 14:
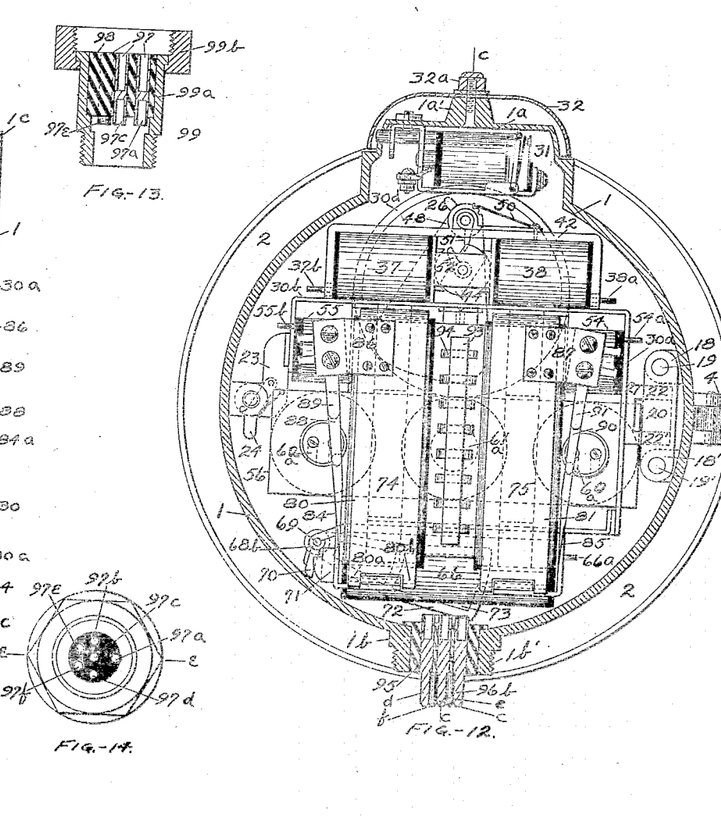
Fig. 12 is a section on line b—b in Fig. 11.
Fig. 13 is a vertical section of a connecting plug.
Fig. 14 is an inverted plan of terminal means for coöperating with said plug.

Referring to Figs. 4 to 14, inclusive, illustrating details of the signal box, a metal lid or cover is hinged to the box 1 by the hinge 4, Fig. 12. The lid 2 is secured in place when closed by the lock 5 engaging suitable fastening means in the box 1. In the face of the lid 2 are the openings 6, 7, 8, 9 and 10. The opening 6 is a round hole with a chamfered edge having the glass 11 protecting semaphore arms 28 and 29. The rectangular opening 7 also has the glass 12 backed by plate 13, Fig. 11, on which are printed the words Signals operating. The plate 13 also has the small window 14. The round openings 8, 9 and 10 have secured therein colored lenses 15, 16 and 17. Box 1 is preferably circular in shape and formed as a casting of suitable metal, provided with flange 1$^c$ for securing the box to a suitable support. The glass plates 11 and 12 are held in position against annular beads 2$^a$ and 7$^a$ by spring ring 113 and by plate 13, respectively, suitable cushioning rings 11$^a$ and 12$^a$ being provided therefor. Lenses 9, etc., are held against annular flanges 9$^a$ by spring ring 16$^a$.

In order to permit the mechanism to fit compactly into the box, and yet allow it to be swung out of the box for inspection, etc., I prefer to mount the frame 30 thereof by a hinge 20′ on a slide 20, which is mounted to slide on horizontal bars 19 and 19′ secured to the back of the box and to lugs 18 and 18′, so that the mechanism may be first drawn bodily forward on said slide and turned thereon to swing it out of the box. A spring catch 24 is provided, operated by a spring 24$^a$ and engaging a notch on rod 25, which is secured to back of box 1 and adapted to extend through a hole 23 in the frame 30.

Attached to the front of the vertical frame member 30$^d$ is a circular dial plate 26 having a round hole 27. A semaphore arm 28 operates to the left immediately in front of the circular plate 26 and is attached to the shaft 33 passing through a second hole in plate 26. The shaft 33 is attached to and is operated by the armature of the electromagnet 35 suitably mounted on the frame members 30ᵇ and 30ᶜ immediately behind the dial plate 26. A second semaphore arm 29 designed to operate to the right in front of semaphore arm 28 is attached to a shaft 34 passing through a hole in the center of the shaft 33. The shaft 34 extends through and beyond the electromagnet 35 and is attached to and operated by the armature of the electromagnet 36 which is suitably mounted on a horizontally extending portion of the frame member 30ᵃ in line with and behind the electromagnet 35.

Figures 5, 6, 7, 8, 9, 10:
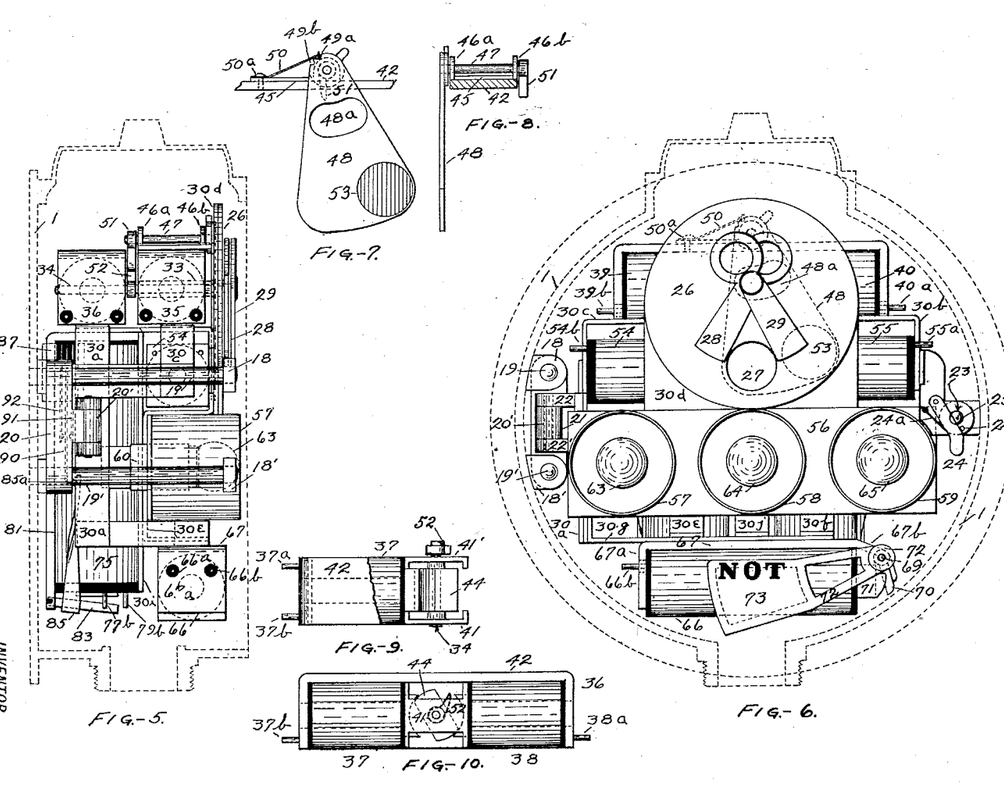
Fig. 5 is a side elevation and Fig. 6 is a front elevation of the indicator and alarm mechanism, the casing therefor being indicated in dotted lines.
Fig. 7 is a front elevation and Fig. 8 is a side elevation of the tell-tale device.
Fig. 9 is a plan of a portion of one of the electromagnetic devices for operating the indicator.
Fig. 10 is a side elevation thereof.
Figure 11:
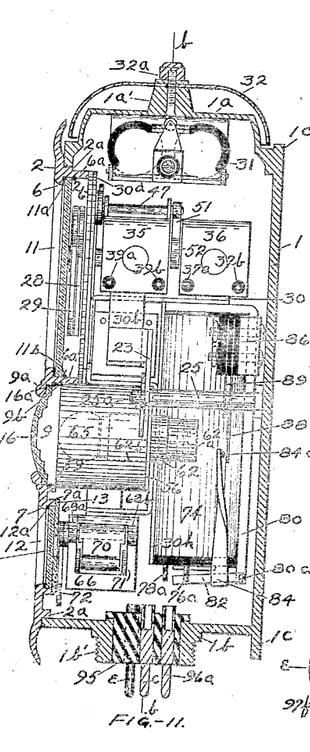
Fig. 11 is a vertical section of the indicator on line c—c in Fig. 12.

As the construction of both of the electromagnets 35 and 36 is alike except for the diameter of the shafts 33 and 34, a description of the electromagnet 36, illustrated by Figs. 9 and 10, will suffice for both. Referring thereto, 37 and 38 are coils having their cores extended into enlarged semicircular heads at one end and are attached together by the side plates 41 and 41', Fig. 10, and sectional view Fig. 9, and serve as bearings for the shafts 33 and 34. Magnetically connecting to protruding ends of the cores of the coils 37 and 38 is a soft iron field 42 having the shape as shown. Suitable terminals from the coils are brought out through insulating bushings in the field plate 42 as at 37ᵃ and 37ᵇ and 38ᵃ and 38ᵇ. The enlarged core heads form a semicircular field within which operates a soft iron bar armature 44 having an extreme length slightly less than the diameter of a circle formed by the enlarged core heads. The armature 44 is so mounted on its shaft that when the coils 37 and 38 are non-energized its axis will rest at an angle of 60°, but when the coils are energized will turn into a horizontal position with its axis parallel and coincident to a line passing through the center of the cores of the coils 37 and 38, thereby moving the semaphore arms from their normal angle of 60° to indicating horizontal position.

Figs. 7 and 8 illustrate details of a shutter designed to operate immediately behind the hole 27 in the dial plate 26, and referring thereto:

45 is a plate or mounting having the vertical members 46ᵃ and 46ᵇ turned up at opposite sides of one end to form bearings for a shaft 47, to one end of which is attached the triangular plate 48 of aluminum or other light material. A hole 48ᵃ is cut in the shutter 48, as shown in Fig. 7, to clear the semaphore shafts 33 and 34. In the upper circular end of the shutter 48 two notches 49ᵃ and 49ᵇ are cut and engage the bent end of a spring 50 attached by a rivet or screw 50ᵃ to the base plate 45. On the opposite end of the shaft 47 is attached a short arm 51 having a straight side in line with the center of the shaft 47 and hanging vertically downward when the shutter 48 is in such a position that the spring 50 engages the notch 49ᵃ. A second short upwardly extending arm 52, Figs. 9 and 10, is attached to the shaft 34 between the electromagnets 35 and 36 also having a straight side in line with the center of the shaft 34 and in such a relation to the arm 51 on the end of the shutter shaft 57 that when the armature of the electromagnet 36 is operated to a horizontal position the arm 52 will engage the arm 51 turning the shaft 47 and moving the shutter 48 into such a position that the upper bent portion of the spring 50 will snap into and engage the notch 49ᵇ locking the shutter 48 in this new position. In its normal position the shutter 48 presents a blank face to the hole 27 in dial plate 26 but when the coils of the electromagnet 36 are energized and the armature 44 is attracted to its horizontal position the shutter will be moved as above described so that a red target 53 painted thereon will appear at the hole 27 in dial plate 26.

Immediately below the electromagnet 35 and suitably attached to frame members 30ᵇ and 30ᶜ are the non-inductive resistance coils 54 and 55, Fig. 20, having the terminals 54ᵃ and 54ᵇ, and 55ᵃ and 55ᵇ, respectively. These coils consist of a length of wire having a suitable resistance wound non-inductively on a spool having a non-magnetic core and need no further detail description. Their purpose is to afford means for increasing the resistance of the secondary winding of combination relays and transformers 74 and 75, as mentioned in connection with Fig. 2, and are necessary owing to the limited winding area on the aforementioned coils.

Below the non-inductive coils 54 and 55 is the lamp bank. This consists of the metal plate 56 suitably attached to the frame members 30ᵉ and 30ᶠ. On the front of the plate 56 and securely attached thereto are the metal tubes 57, 58 and 59 having their centers opposite the centers of the lens openings 8, 9 and 10, Fig. 4, and are of such a length that their front or open end will just touch the inwardly extending ridge 9ᵇ, Fig. 11, when the cover 2 is securely closed into box 1. Centrally mounted within the tubes or shades 57, 58 and 59 are the lamp receptacles 60, 61 and 62 of any suitable type designed for low voltage battery lamps having their terminal portions 60ᵃ, 61ᵃ and 62ᵃ extending rearwardly through the plate 56 while the socket portion 60ᵇ, 61ᵇ and 62ᵇ extending within the shades have the lamps 63, 64 and 65 of suitable voltage and candle power therein.

Below the lamp bank and suitably mounted on the frame member 30ᵍ is the operating mechanism of the Out of order signal in the opening 7, Fig. 4, and consists of the low resistance electromagnet coil 66, having the terminals 66ª and 66ᵇ passing through insulating bushings in the end 67ª of the pole piece 67 which is a soft iron bar bent at right angles, as shown, and attached to a protruding end of the core of coil 66. The opposite end of pole piece 67 is bent downwardly at a suitable angle as at 67ᵇ and is slotted inwardly leaving the protruding ends 68ª and 68ᵇ which are bent back upon themselves to form bearing members for a shaft 69 to which is attached the armature 70 designed and so mounted as to work betwen protruding sides of the enlarged core head 71 of coil 66. On the front end of the shaft 69 is the light but strong frame member 72 having the shutter 73 on the upper face of which is printed the word Not. The shutter 73 is so mounted and designed as to operate immediately back of the rectangular opening 14 in the back plate 13 covering the opening 7, Fig. 4, so that when the coil 66 is energized and the armature 70 operated, the shutter 73 will present a blank face to the opening 14 but when the coil 66 is deënergized the word Not will appear in opening 14.

Vertically mounted on frame members 30ʰ and 30ⁱ, behind the non-inductive coils, lamp bank and coil 66 and below the electromagnet 36, are the combination primary relays and transformers 74 and 75 and consist of a core (having an enlarged head or pole) on which are wound the primary windings 76 and 77 and secondary windings 78 and 79, Fig. 20. Terminals for both windings are provided as at 76ª and 78ª, Fig. 11, and 77ᵇ and 79ᵇ, Fig. 5. Soft iron pole pieces 80 and 81 bent at right angles and attached to protruding ends of the cores at the upper end of coils 74 and 75, have protruding ends as at 80ª and 80ᵇ, to form bearings for a shaft or pin on which operates the armature 82 or 83. The fingers 84 and 85 are bent at right angles and suitably attached to the armatures 82 and 83, their upwardly extending portions being twisted at right angles and having insulating buttons 84ª and 85ª suitably mounted near their ends. Near the upper end of the pole pieces 80 and 81 are suitably attached the contact spring mountings 86 and 87 consisting of metal and insulating parts designed to rigidly hold and insulate the contact springs 88 and 89, coil 74, and contact springs 90, 91 and 92, coil 75, which are provided with contact points of platinum or other suitable metal. The contact springs 88 and 90 are extended and so mounted that they will be engaged by the fingers 84 and 85 making or breaking contact with their related contact springs when the armatures 82 and 83 are operated by the energizing of the coils 74 and 75. Between the relays 74 and 75 and suitably attached to frame members 30ʲ is a terminal strip 93 having the terminal punchings 94.

A multiple plug holder 95 consisting of insulating material in which are imbedded the metal plugs 96ª, 96ᵇ, 96ᶜ, 96ᵈ, 96ᵉ and 96ᶠ is securely fastened in the hole in the downwardly extending member 1ᵇ of box 1. The upper ends of the plugs 96 extend a little beyond the insulation 95 and are bored out to form terminal means for connecting wires thereto. The lower ends of the plugs 96 are turned down to a slightly smaller and uniform diameter, and so staggered and designed as to accurately fit into similarly staggered tubes 97ª, ᵇ, ᶜ, ᵈ, ᵉ and ᶠ contained in a second insulating plug 98, filling the center of the shouldered portion 99ª of union 99, Fig. 13. The threads of the female locking nut 99ᵇ, Fig. 13, engage the threads 1ᵇ′ cut on a portion of the member 1ᵇ of box 1 and rigidly secures the plugs 96 when inserted into their respective jacks or tubes 97.

Flexible wires are connected between certain of the terminal punchings 94 and the plugs 96 as well as between certain of the punchings 94 and the bell mechanism 31, thereby providing means whereby the apparatus mounted on the frame 30 can be opened out from the box 1 without disconnecting any of the wiring. As shown in Fig. 14, the plugs are staggered, so that when the plugs 96 have been separated from their respective jacks 97 they can only be reconnected in a certain manner insuring proper relation being maintained between wires connected thereto.

Figure 19:
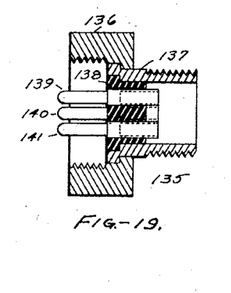
Fig. 19 is a longitudinal section of a connection plug for the electrode tube.

Combination plugs and jacks contained in a form of pipe union and having the features illustrated in Figs. 13, 14 and 19, and having a suitable number of connecting members are designed for use at all intermediate points when it may be necessary to connect sections of conduit or pipe containing wires between the various equipment. Flexible or rigid conduits may thus be employed in convenient lengths for ready removal or installation without the necessity of cutting and reconnecting the respective wires and by a standard system of staggering proper reconnection is always assured between the equipment when for any reason the equipment and wire has been partly or entirely removed. The windings of all the coils contained in the signal box are protected from moisture and destructive gases by covering with a thin metal non-magnetic tube of suitable form.

An apparatus designed to integrally contain suitable members for establishing electrical contact with the water in a steam boiler and also containing means for connecting wires thereto is illustrated in Figs. 15, 16, 17 and 18, and referring thereto: the complete tube 100, Fig. 15, consists of four principal parts or sections, as follows, namely: outer tube 101 (Figs. 15, 17 and 18) having an enlarged head 105 suitably tapered and threaded to engage a tapered threaded hole in the shell of a boiler and having a squared extension to form means whereby a wrench or other tool may be applied when screwing the threaded member 105 in or out of the boiler, said tube 101 having a bore threaded throughout its entire length; a second tube 102 also having an enlarged end or head 107 bored out and channeled, as shown, and having the outer circumference of the shaft portion 108 threaded so as to engage with and screw into the center of tube 101 for its entire length; a shell 103 closed at one end and having a portion of the inner circumference at the open end 109 threaded to engage threads cut on the outer circumference of the head 107 of tube 102; and a core piece of insulating material 104 consisting of the shaft portion 110 having a length and external diameter equal to the length and internal diameter of the tube 102, an enlarged portion 111 near one end turned and channeled to fit the bored out and channeled head of 107 of tube 102 and an extending member 112 from the head 111 of less diameter and length than the shaft 110.

The core rod 104 is composed of bakelite, or other suitable insulating material having great heat resisting and electric insulating qualities and impervious to water. Embedded in the insulating core 104 are the metal tubes 113, 114 and 115, with the connecting wires 116, 117 and 118, securely attached thereto, in Figs. 17 and 18. On the extended member of 112 of core 104 are the metallic tubes 119, 120 and 121, Fig. 17, electrically connected to their respective wires 116, 117 and 118. On the outside of the tubes 119, 120 and 121 and in electrical contact therewith are the tubes or sleeves 122, 123 and 124 preferably of carbon, or other material not easily decomposed or disintegrated by electrolysis. Between the sets of metal and carbon tubes are the channeled bushings 125 and 126 of similar insulating material to the core 104. The end set of electrodes consisting of metal tube 121 and carbon sleeve 124 is secured by the metal plate 127 held in place by the screw 128 engaging a threaded hole in the end of member 112.

The end 129 of tube 101 facing the head 107 of inner tube 102 is faced off and a shallow recess 130 cut therein leaving a sharp edge on its outer angle. The facing end of the head 107 is turned to a quarter circle 131 so that when the head 107 of tube 102 is screwed up against the channeled end 129 of tube 101 a steam tight ball joint will be formed. A suitable packing may also be placed in channel 130 if necessary. The insulating core 104 has its shaft portion 110 turned to such a size that it will drive into the hollow center of tube 102 while the head 111 is turned and channeled to completely engage the bored out channeled interior of head 107, forming steam tight joints therewith. The shell 103 is of such an external diameter and its threaded portion is of such a length that when it is screwed on the head 107 that its open end will join with the faced off end 129 of tube 101 and form a smooth continuation thereof. A series of small holes 132 are bored in the circumference of the shell and a larger hole 133 in its inclosed end. It is evident that if the shell or electrode end of the complete tube 100 is immersed in water to the junction of the shell 103 and tube 101 that water will enter the shell 103 through the holes 132 and 133 and will make electrical contact between the electrodes 122, 123 and 124 and that if the tube 100 be rapidly lifted out and into the water that the holes 132 and 133 can be so proportioned that the shell 103 will hold sufficient water for a few seconds to insure contact between the electrodes. This slow acting feature is designed to prevent a rapid making and breaking between the electrodes and the water due to the slushing of the water in the boilers of locomotive and marine vessels. But, if the water in the boiler slowly recedes, as when being converted into steam, the water in the shell 103 will recede with it and contact will be broken between the electrodes. The small metal tubes 113, 114 and 115 embedded in the insulating core 104 are staggered or unequally spaced, as shown in end view Fig. 16, and maintain the same relative spacing throughout their entire length.

The combination jack and union 135, Fig. 19, consists of two of the three parts making up an ordinary pipe union, to-wit: the female lock nut 136 and the shoulder member 137 having either male or female threads on its extending portion to connect to a pipe or conduit. Within the shouldered member 137 is a plug 138 of the same insulating material as the core 104 having embedded therein the metal plugs 139, 140 and 141 having their face ends turned to such a size and so staggered that they will accurately fit into the open ends of the tubes 113, 114 and 115 embedded in the core 104. The inner ends of the plugs 139, 140 and 141 extend beyond the plug 138 and are bored out to form terminal means for connecting wires. When the plugs 139, 140 and 141 are inserted into their respective tubes 113, 114 and 115 in the end of the core 104 and the female lock nut 136 is screwed on the extending portion 134 of tube 102, it is evident that a rigid and permanent metallic and electrical connection will be secured between the tubes 113, 114 and 115 and the plugs 139, 140 and 141 and that they can be separated and again connected without disturbing the relation existing between the electrodes 122, 123 and 124 and the wires connecting to plugs 139, 140 and 141.

As all types of steam boilers vary in their size and design, the electrode tubes will have to be of various lengths to insure the immersing of the electrode end to the proper depth in each boiler. It is evident, from the description and illustrations of the complete electrode tube 100, Figs. 15, 16, 17 and 18, that it can be made of a certain standard length, equal to the greatest depth to which the electrodes will be immersed in the largest type of boiler. To reduce its total length the outer tube 101 is unscrewed from the inner tube 102 and the end at 129 cut off the required distance and the recess 130 again cut therein. It is then screwed back on the tube 102 and the protruding end 134 of tube 102 is also cut off leaving only a sufficient length to properly engage the lock nut 136 of the union 135. As the tubes 113, 114 and 115 in the core 104 are relatively spaced they will again fit the plugs 139, 140 and 141 in the combination plug and union 135.

An electrode tube designed as above described is very flexible in its application, can be made in standard sizes and designs and be altered to suit each local requirement at a minimum of cost and labor. It is easily installed and removed and the electrodes are always accessible for cleaning or repairs by removing the shell 103. It can be made with a varying number of electrodes without altering the standard design by shortening or lengthening the member 112 of core 104 and installing the required number of electrodes thereon, each having connecting wires and tubes embedded in the core and corresponding plug connections in the union plug.

Figure 1:
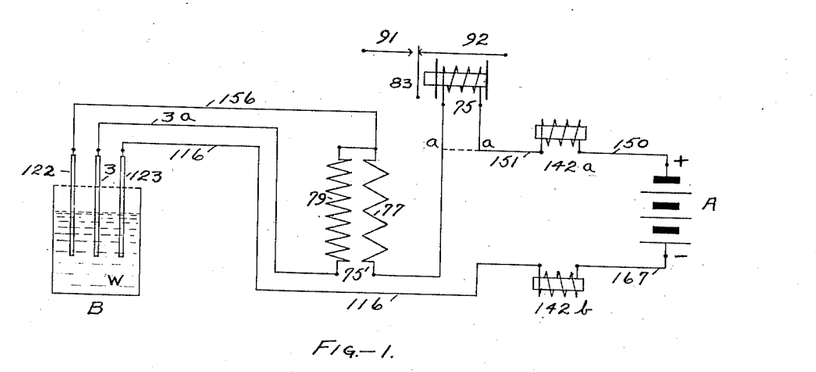
Figure 1 is a diagram illustrating the principle involved in overcoming polarization.

Referring to Fig. 1, which illustrates the circuits as far as is required for explaining the depolarizing action, the battery A is shown as connected in a circuit including a wire 150 leading from said battery to an impedance or choke coil 142ᵃ from which a wire 151 leads to an electromagnet 75, a primary winding 77 of a transformer 75′ being also included in this connection, and being here shown as separate from the electromagnet. From said primary winding a wire 156 leads to electrode 122 immersed in electrolyte, such as a body W of water, or dilute acid, or alkaline or neutral salt solution, contained in a vessel B, such as a boiler. From another electrode 123 of like material to electrode 122 immersed in such liquid, a wire leads to an impedance or choke coil 142ᵇ from which a wire 167 leads back to battery A. A secondary winding 79 of transformer 75′ is connected at one end to wire 156 and at the other end by wire 3ᵃ to an electrode 3 between electrodes 122 and 123.

If current is allowed to flow from the positive side of battery A through wire 150, impedance coil 142ᵃ, wire 151, coil 75 and primary coil 77 and wire 156, to plate 122 through solution W in vessel B to plate 123 and wire 116, impedance coil 142ᵇ, and wire 167, back to negative side of battery A, the water in the solution W will be more or less decomposed by the current passing through it and gas will collect on the electrodes, the degree of electrolysis of the water depending upon the quantity of current flowing through the circuit. The gases liberated by the decomposition of the water and collecting on the electrodes in the solution W as heretofore mentioned, quickly reduce the flow of current. Immediately on the reduction of the current an induced current of relatively high voltage is generated in the secondary coil 79 of the transformer 75′ and flows through the circuit consisting of the wire 156, plate 122, solution W, plate 3, wire 3ᵃ, and secondary coil 79. This secondary current being momentary of relatively higher voltage compared to the original primary current breaks down the gas film and decreases the resistance so that the direct current can again flow. The forming and dissipating of the gas film takes place with sufficient repidity to allow an almost constant flow of direct current through the primary circuit so that the coil of the relay 75 or other device in the circuit will be constantly energized as long as the plates 122 and 123 are immersed in the solution W.

Due to the varying degrees of strength of the primary circuit, the induced current in the secondary coil 79 becomes practically alternating in character and to prevent a loss of its efficiency in acting upon the gas film on the electrode plates by a certain portion of the secondary current backing up through the battery A, the impedance or choke coils 142ᵃ and 142ᵇ are introduced in the circuit to impede the transmission of such alternating current to battery A.

Figure 2:
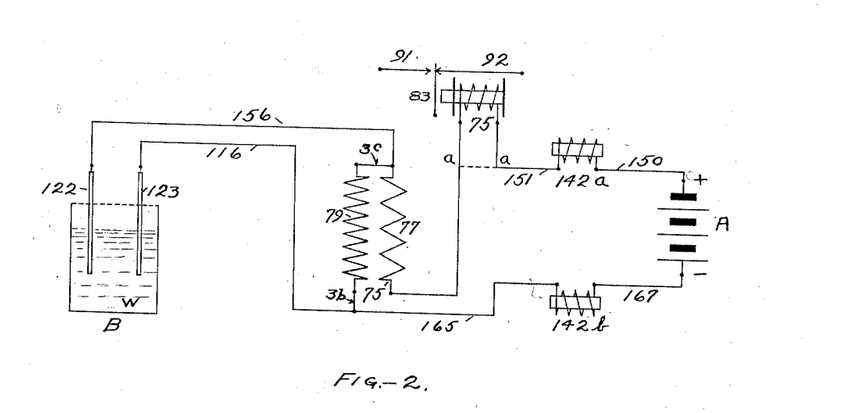
Fig. 2 is a diagram showing a modified form of the circuits.

A more effective circuit arrangement is shown in Fig. 2 wherein the plate 3, Fig. 1, has been eliminated. The secondary coil 79 of the transformer 75′ is practically bridged across the primary circuit by connection 3ᵇ to wires 165 and 116 and plate 123 and by connection 3ᶜ to wire 156 connecting to plate 122.

The modified circuit Fig. 2 using only two plates or electrodes 122 and 123 is just as effective as the circuit shown in Fig. 1 except that by reason of the secondary coil 79 being permanently bridged across the primary circuit, the winding of the secondary coil must be so proportioned that it will have a resistance equal to or greater than the total resistance of the primary circuit, and the relay 75 must be so designed that it will not be sufficiently energized by the small amount of current flowing through the secondary coil to hold the armature 83 thereof when the primary circuit has been opened by removing one or both of the plates 122 and 123 from the solution W, or when the plates have been so removed and the primary circuit permanently opened by disconnecting the battery A that the coil of the relay will not be sufficiently energized to attract its armature when the battery A is again connected, until the total resistance has been reduced by again immersing the plates 122 and 123 in the solution W. The circuit Fig. 2 is especially adapted where, for mechanical or electrical reasons, it is desirable to simplify the construction of apparatus containing the electrodes by reducing their number and also the number of wires leading thereto.

An especially useful and valuable application of the principle above described and illustrated by Fig. 1 and Fig. 2 is that of an electrically operated low water alarm for steam boilers. In this application advantage is taken of the fact that the resistance of comparatively pure or distilled water is greatly reduced when heated. This reducing of resistance is particularly noticeable and very rapid between 140° and 212° F. and above 212°, when the boiling point has been increased by pressure, as occurs in steam boilers. As the water ordinarily used in steam boilers is seldom free from impurities of a mineral, salt or alkaline nature the conductivity of the water is also increased at varying degrees of heat depending on the quantity of impurities impregnated therewith.

Fig. 20 shows suitable circuit connections for a locomotive boiler water level indicator, such connections including a wire 150 leading from positive side of battery A to impedance coil 142$^a$, the connection being continued by wire 151, connector 147 and wire 152 to switch arm 144, thence through contacts 145, 145', wire 153, connector 96$^a$ and wire 154 to a terminal punching on terminal strip 93; thence by wire 155 to primary winding 77, of relay 75, wire 156, wire 157, connector 96$^f$, wire 158, connector 141, wire 118 to electrode 122, through water W to electrode 123, wire 116, connector 139, wire 159, connector 96$^d$, wire 160, across terminal, strap wire 161, to terminal punching, wire 162, coil of signal 66, wire 163, across terminal, wire 164, connector 96$^c$, wire 165, connector 148, wire 166, impedance coil 142$^b$, wire 167 to negative side of battery A. Also a connection leads from wire 154, terminal and wire 168 to primary winding 76 of relay 74, wire 169, wire 170, connector 96 E, wire 171, connector 140 and wire 117 to electrode 124 and through water W to electrode 123, thence back to battery, as above described. One end of secondary winding 79 of coil 75 is connected to the wire 156 at the terminal of primary winding 77, and to the electrode 122 by the wires 156, 157, 158 and 118. The opposite end of secondary winding 79 connects by wire 198 to resistance 55 and wire 200, wire 201, wires 160, 159 and 116 to electrode 123. One end of secondary winding 78 is connected to the wire 169 at the terminal of primary winding 76, relay 74 and to the electrode 124 by the wires 169, 170, 171 and 117. The opposite end of secondary winding 78 connects by wire 199 to resistance 54, wire 200 and wires 201, 160, 159, and 116 to electrode 123.

Switch 143 is provided with contacts 145' with which the arm 144 may make contact before it makes connection with contact 145 and 146, contacts 145' being connected to contact 145 so that connection is first made to the relay circuits through wire 153 before it is made to the large signal circuit through wire 172. This enables the relays to properly control the lamp circuits before current is switched on to the lamps and possibility of a momentary wrong signal is thereby prevented.

Assuming the water W to be at or above the level X and the switch 143 to be in position shown connecting battery A with both the primary and signaling circuits, the primary circuit is established, as above described. This energizes the relays 74 and 75, causing their respective armatures 82 and 83 to be operated, breaking the contact between contact springs 88 and 89, of relay 74 and contact springs 90 and 91, of relay 75 but making a contact between contact springs 90 and 92, of relay 75. A signal circuit is thus established as follows: Beginning at positive side battery A, wire 150, coil 142$^a$, wire 151, connector 147, wire 152, switch arm 144, contact 146, wire 172, connector 96$^b$, wire 173, across terminal, wire 174, wire 175, contact springs 90 and 92, of relay 75, wire 176, through lamp 64, wire 177, wire 178, wire 179 to terminal, wire 162, coil of signal 66, wire 163, across terminal, wire 164, connector 96$^c$, wire 165, connector 148, wire 166, coil 142$^b$, wire 167 to negative side of battery A. This lights the green signal lamp 64 indicating that the water W in vessel B is at or above the safe level X.

Figure 4:
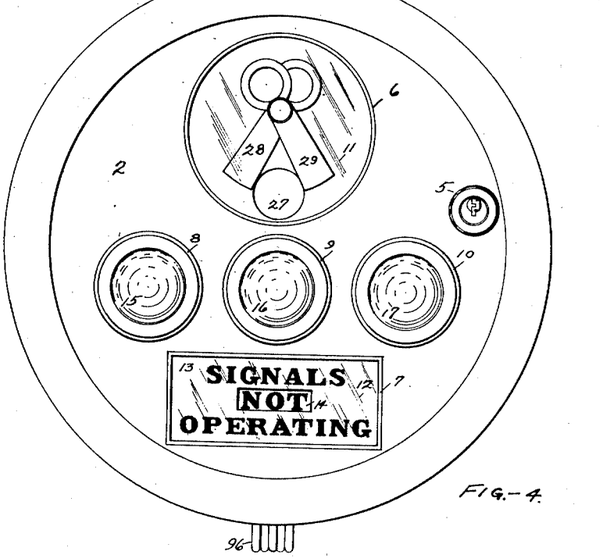
Fig. 4 is a front elevation of a signal box for giving the low water indication and alarm.

It will be noted that the return of both circuits joins the wire 162 at a terminal punching on terminal strip 93 and that their common return to negative side of the battery is through the winding of the signal coil 66, thereby operating its armature 70 and lifting the shutter 73, so that the signal Fig. 4 will read Signals operating. It is evident that if the switch 143 is turned to the off position, or that if the battery A is discharged or disconnected, or that if any part of the circuit between the battery A and the switch 143 should be cut off from the signal 66, allowing the shutter 73 to drop down, causing the signal to read Signals not operating indicating that the apparatus is out of order.

If the water W in vessel is now reduced to the level of Y, it is evident that the portion of the primary circuit through relay 75 will be opened at electrodes 122 and 123, the relay 75 deënergized releasing its armature 83, breaking contact between contact springs 90 and 92 and putting out the green signal lamp 64. But as contact spring 90 is connected direct to the battery current and contact, is now established between contact springs 90 and 91, a signal circuit will be established as follows: Beginning at contact spring 90 to contact spring 91 wire 180, wire 181, through lamp 63, wire 182 to common signal wire 178, and from contacts 90 and 91, wire 180, wire 183, coil 39, wire 184, coil 40 of electromagnet 35, wire 185, wire 186, to common wire 178, wire 179 to terminal, and thence by wire 162, coil 66, and wires 163, 164, 165, 166 and 167 to battery. The completion of this circuit lights the yellow signal lamp 63 and also energizes the coils 39 and 40 of electromagnet 35, raising the yellow semaphore arm 28 to a horizontal position indicating that the water has reached the caution level of Y.

If the water is now restored to the previous level of X, contact will again be established between the electrodes 122 and 123, current will flow through the relay 75, operating the armature 83, breaking the circuit through lamp 63 and electromagnet 35 and again restoring the circuit through lamp 64, indicating the safe level of water W.

If, instead of restoring the water W to the level of X, it is further reduced to the level of Z, the caution signals 63 and 35 will remain in indicating position, but as the remainder of the primary circuit through relay 74 is now broken at electrodes 123 and 124, the relay 74 will be also deënergized, releasing its armature 82 and making a contact between contact springs 88 and 89, thereby establishing a second signal circuit as follows: Beginning at battery wire 173 at terminal on strip 93, across terminal, wire 174, wire 187, contacts 88 and 89, wire 188, wire 189, wire 190, through lamp 65, wire 191 to common wire 178, and from contact springs 88 and 89, wire 188, wire 189, wire 192, coil 38, wire 193, coil 37 of electromagnet 36, wire 194, wire 186, to common wire 178, thence by wire 179 to common return wire 162 at terminal. A circuit is also established from contacts 88 and 89, wire 188, wire 195, across terminal, wire 196, through bell 31, wire 197, and across terminal to common return wire 162. The completion of this circuit lights the red signal lamp 65, energizes the coils 37 and 38 of electromagnet 36 raising the red semaphore arm 29 to a horizontal position and rings the bell 31, thereby giving both visual and audible signals that the water W has reached the dangerous level of Z.

If, now, the water W in vessel B is restored to the level of Y, contact will again be established between electrodes 123 and 124, current will flow through the relay 74, operating the armature 82 and breaking the circuit through lamp 65, electromagnet 36 and bell 31, but as the circuit is still open through the relay 75, the caution signals will remain operating until the water is restored to the original level of X and the green safe signal operated.

The shutter 48, Fig. 6, is operated and locked in its indicating position when the electromagnet 36 is energized, presenting the red target 53 to the hole 27 in dial plate 26, thereby giving an indication to proper officials, for instance, the boiler inspector, that at some time during the trip of the locomotive the water in the boiler had reached a low level, and if considered necessary, an inspection of the crown sheet S of fire-box F, Fig. 3, can be made. This is a safety measure and does not reflect on the vigilance of the engine crew, but as the shutter 48 can only be restored to its "clear" position by unlocking the door 2 of the signal box 1, and resetting by hand, and as keys to the box are only in the hands of authorized employees, the tell-tale signal cannot be tampered with. Its operation to and locking in the indicating position does not prevent the red semaphore arm 29 being restored to its non-indicating position when the water level is restored, or does it prevent subsequent indicating operation of semaphore 29 if the water is again reduced to the danger level.

Figure 21:
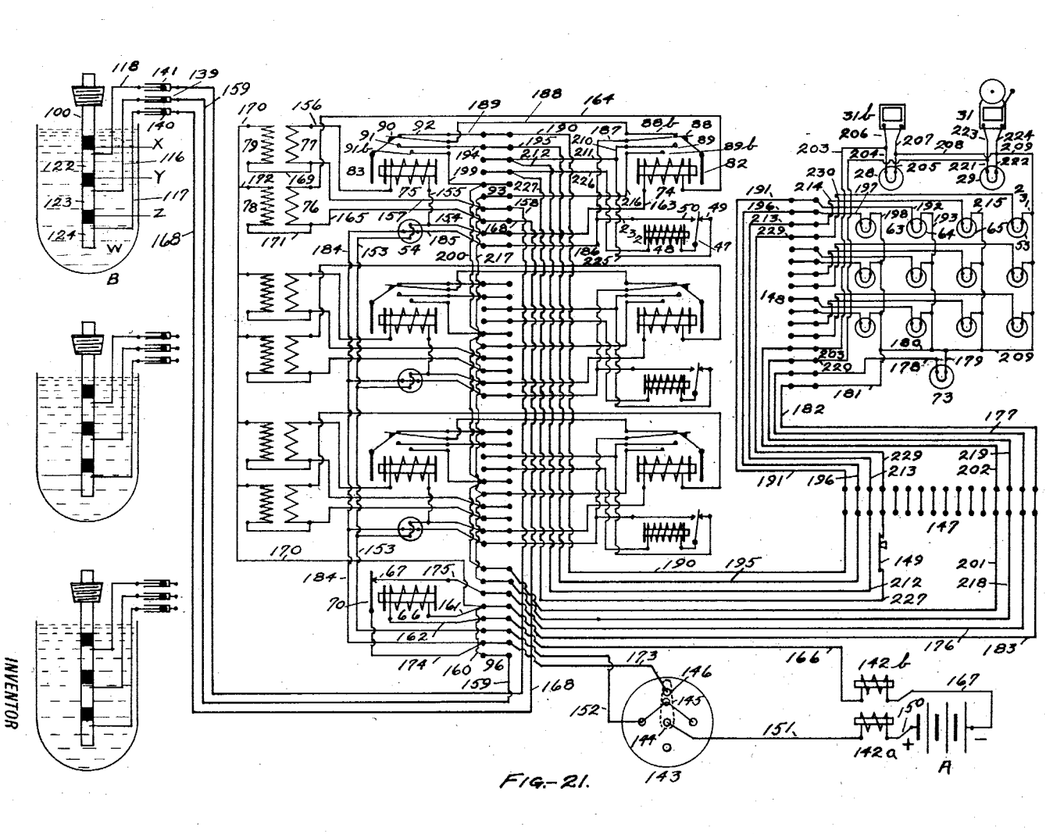
Fig. 21 is a diagram of circuit connections suitable for a battery of stationary boilers.

Fig. 21 shows connections suitable for a battery of stationary or marine boilers which may be equipped with electrode tubes and the controlling and signaling apparatus separately installed in a convenient and accessible manner. The signals controlled by two or more electrode tubes may be collectively installed in a signal box of suitable form and certain signals common to all be provided. Extension signal boxes are also provided for whereby the signals may be indicated in two or more parts of a factory or ship.

Three electrode tubes are shown in Fig. 21 with their respective boiler sections, signal controlling apparatus, and corresponding signals. Local wiring is illustrated to define the relation with common circuits, but to avoid congestion of the drawing the interconnecting wiring between the electrode tubes, relays and signals is only shown in one set. The signal box may be of any suitable form having the required number of lamps, receptacles and audible signals, including some form of terminal strip. The extension signal boxes may be duplicates of the main box or a modification thereof.

It will be noted by referring to Fig. 21 that the combination relays and transformers in Fig. 20 have been separated into separate units, as greater space is available in stationary or marine installations and complications in construction are thereby avoided. The transformer is a separate unit, while the primary relays are equipped with extra contact springs as a slightly different method of signaling is provided for. Local cut out switches are also provided so that when one or more boilers are out of service their respective signals are cut off without interfering with the operation of the signals connected to live boilers.

The connections are such that when the water W in the vessel B is at or above the level X and the master switch 143 and local switch 54 is in position connecting the battery A with both the primary and signaling circuits, the primary circuit is established as follows: From the positive side of battery A, through wire 150, impedance coil 142$^a$, wire 151, switch arm 144, contact 145, wire 152, across terminal on 96, wire 153, through switch 54, wire 154, wire 155, coil of relay 75, wire 156, primary winding 77, wire 157, across terminal on 93, wire 158, connector 141, wire 118 to electrode 122, through water W to electrode 123, wire 116, connector 139, wire 159, to terminal on 96, strap wire 160, to terminal, wire 161, coil of pilot relay 66, wire 162, across terminal, wire 166, impedance coil 142$^b$, wire 167 to negative side of battery A. And from local switch 54, wire 154, across terminal on 93, wire 163, coil of primary relay 74, wire 164, primary winding 76, wire 165, across terminal, wire 168, connector 140, wire 117, to electrode 124, through water W to electrode 123 thence back to battery, as above described. The secondary winding 79 is connected by the wire 169, wire 157, wire 158 and wire 118 to electrode 122 and by wire 170, strap wire 160, wire 159 and wire 116 to electrode 123. The secondary winding 78 is connected by the wire 171, wire 165, wire 168, and wire 117 to electrode 124, and by wire 172, wire 170, strap wire 160, wire 159 and wire 116 to electrode 123. This energizes the primary relays 74 and 75, causing their respective armatures 82 and 83 to be operated, making a contact between contact springs 88 and 88$^b$, relay 74, and contact springs 90 and 92, relay 75. A signal circuit is thus established as follows: Beginning at positive side of battery A, wire 150, coil 142$^a$, wire 151, switch arm 144, contact 146, wire 173, across terminal on 96, wire 184, through switch 54, wire 185, across terminal on 93, wire 186, wire 187, contacts 88 and 88$^b$, relay 74, wire 188, contacts 90 and 92, relay 75, wire 189 across terminal, wire 190, across terminal on 147, wire 191, across terminal on 148, wire 192, through lamp 64, wire 193, wire 180, wire 181, across terminal, wire 182, across terminal on 147, wire 183, across terminal on 96, wire 161, coil of pilot relay 66, wire 162, across terminal, wire 166, coil 142$^b$, and wire 167 to negative side of battery A. This lights the green signal lamp 64 indicating that the water W in vessel B is at or above the safe level X.

The operation of this form of the invention is substantially the same as above described.

What I claim is:

1. A signal system including a conducting medium, a series of contacts connected in succession by the conducting medium, a source of current, a conductor from one side of said source of current having branches connected respectively to certain of said contacts, an electro-responsive device in each of said branches, a conductor extending from a contact intermediate said first-named contacts to the other side of said source of current, a plurality of signals equal in number to the number of contacts and means operated by the electro-responsive devices for rendering the signals active one at a time in accordance with the position of the conducting medium relative to the contacts.

2. A signal indicating system comprising a circuit, a source of current, a conducting medium, a series of contacts connected in succession by the conducting medium, and an electro-responsive signal controlling device responsive to the relation between said series of contacts and said conducting medium; means coöperative with said circuit for rendering said electro-responsive signal controlling device effective by reducing a resistance in said circuit caused by a condition of polarization created when said series of contacts are in contact with said conducting medium.

3. A liquid level signal indicating system, comprising a circuit, a source of current, a liquid conducting medium, a series of contacts connected in succession by the conducting medium, and an electro-responsive signal controlling device responsive to the relation between said series of contacts and said conducting medium; means responsive to a resistance in said circuit caused by a condition of polarization created when said series of contacts are in contact with said conducting medium, said means coöperating with said circuit to render effective the operation of said electro-responsive signal controlling device by reducing said resistance caused by said polarization.

4. A signal system including a circuit, a source of current, a conducting medium, a series of contacts connected successively by the conducting medium, and an electro-responsive signal controlling device responsive to the relation between said series of contacts and said conducting medium, a coil in inductive relation to said circuit and connected to said circuit in such a manner as to render said electro-responsive signal controlling device effective by reducing a condition of polarization created when said series of contacts are in contact with said conducting medium.

5. A signal system comprising a circuit, a source of current, a conducting medium, series contacts connected successively by the conducting medium, an electro-responsive signal operative device responsive to the relation between said series contacts and said conducting medium, a coil in inductive relation to said circuit and connected to said circuit in such a manner as to render said electro-responsive signal operative device effective by reducing a condition of polarization created when said series contacts are in contact with said conducting medium; and impedance coils positioned between said source of current and said connection of said coil to said circuit.

6. A signal system including a circuit, a source of current, a conducting medium, a circuit controlling device comprising contacts and the conducting medium, an electro-responsive signal controlling device in said circuit responsive to the relation between said contacts and said conducting medium; means for reducing polarization in said circuit controlling device consisting of a transformer having a low tension primary coil comprising the winding of said electro-responsive signal controlling device, and a high tension secondary coil in inductive relation to said primary coil and bridged across said circuit and in electric connection with said contacts.

7. A signal system comprising a circuit, a source of current, a conducting medium, a circuit controlling device comprising contacts connected successively by the conducting medium, an electro-responsive signal controlling device in said circuit responsive to the relation between said circuit controlling contacts and said conducting medium; means for reducing polarization on said circuit controlling contacts consisting of a transformer having a low tension primary coil comprising the energizing winding of said electro-responsive signal controlling device, and a high tension secondary coil in inductive relation to said primary coil and bridged across said circuit and in electric connection with said circuit controlling contacts; and impedance coils positioned between said source of current and said connection of said high tension secondary coil to said circuit controlling contacts.

8. A signal system including a circuit, a source of current, a conducting medium, a circuit controlling device comprising a series of contacts and the conducting medium, an electro-responsive signal controlling device in said circuit responsive to the relation between said series of contacts and said conducting medium; means for overcoming polarization in said circuit controlling device consisting of a transformer having a low tension primary coil comprising the winding of said electro-responsive signal controlling device, and a high tension secondary coil in inductive relation to said primary coil and in electric connection with said contacts, and a non-inductive resistance coil in series with said high tension secondary coil and said contacts.

9. An electric signal means comprising a box having a cover, guide means in said box, a slide member mounted to slide on said guide means, a frame pivoted to said slide member and signal controlling and signal indicating means mounted on said frame; said frame, including said signal controlling means and said signal indicating means being adapted to swing clear of said box when said cover is open and when said slide member is drawn forward.

10. A signal indicating means comprising a housing having a cover, an audible signal means in said housing, a frame in said housing having mounted thereon semaphore operating electro-magnets, an electric lamp, a terminal strip having a plurality of terminals, and an electro-magnet relay electrically connected to certain of said terminals, circuit controlling contacts operated by said electro-magnet relay, and electrical connections between said circuit controlling contacts, said semaphore-operating electro-magnets, said electric lamp, said terminals and said audible signal means.

11. A signal indicating means comprising a housing having a cover, an audible signal means in said housing, a frame in said housing having mounted thereon a plurality of semaphore operating electro-magnet means, a plurality of electric lamps, a terminal strip having a plurality of terminals, and a plurality of electro-magnet relays electrically connected to certain of said terminals, circuit controlling contacts operated by one of said electro-magnet relays and electrical connections between said circuit controlling contacts one of said semaphore operating electro magnet means, one of said electric lamps, terminals on said terminal strip, and said audible signal means; and a second set of circuit controlling contacts operated by the other of said electro-magnet relays and electrical connections between said second circuit controlling contacts, the second of said semaphore operating electro - magnet means, a second of said electric lamps and said terminals on said terminal strip.

12. A signal indicating means comprising a housing having a cover, an audible signal means in said housing, a frame in said housing having mounted thereon a plurality of semaphore operating electro-magnet means, a plurality of electric lamps, a terminal strip having a plurality of terminals, and a plurality of electro-magnet relays electrically connected to certain of said terminals, circuit controlling contact means operated by one of said electro-magnet relays, and electrical connections between said circuit controlling contacts, one of said semaphore operating electro-magnet means, one of said electric lamps, terminals on said terminal strip, and said audible signal means; and a second set of circuit controlling contacts operated by the other of said electro-magnet relays, and electrical connections between said second circuit controlling contacts, the second of said semaphore operating electro-magnet means, a second of said electric lamps, a third of said electric lamps and said terminals on said terminal strip.

13. A signal indicating means comprising a housing having a cover, a frame in said housing, a dial plate having shaft and shutter holes mounted on the front of said frame, a plurality of semaphore-operating electro-magnets mounted on said frame back of said dial plate, shafts passing through said shaft hole in said dial plate and attached to armatures operated by said semaphore operating electro-magnets, semaphore arms mounted on said shafts and adapted to operate in opposite directions in front of said dial plate, a shutter adapted to operate back of the shutter hole and presenting a blank face to said shutter hole in one position and a colored face to said shutter hole in a second or operated position; means for operating the shutter and presenting the colored face to said shutter hole when one of said semaphore arms is operated upon energization of its respective semaphore operating electro-magnets, means for locking said shutter in second or operated position when said semaphore operating electro-magnet is deënergized, and means for manually restoring said shutter to the first or non-operated position.

14. A signal indicating means comprising a housing having a cover, a frame in said housing, a dial plate having a hole mounted on the front of said frame, a plurality of electro-magnets mounted on said frame and back of said dial plate, armatures respectively operated by said electro-magnets, shafts attached to said armatures and protruding through said hole in said dial plate, semaphore arms mounted on said shafts and adapted to operate in opposite directions in front of said dial plate, and transparent means in said cover so positioned that the operations of said semaphore arms may be observed when said cover is closed.

15. A signal indicating means comprising a housing having a cover, a frame in said housing, a dial plate mounted on the front of said frame, semaphore-arms mounted to operate in front of said dial plate and operated by respective electro-magnet means, a tell-tale signal means including a shutter hole in said dial plate and presenting a blank face to said hole in one position and a colored face in a second or operated position, means for operating said shutter to the operated position when one of said electro-magnet means is energized, means for locking said shutter in the operated position when said electro-magnet means is deënergized, and means for manually restoring said shutter to the first or non-operated position, and transparent means in said cover so positioned that the operation of said semaphore arms and said tell-tale signal means may be observed when said cover is closed, and means for fastening said cover to said housing in such a manner as to prevent unauthorized access to said tell-tale signal means.

16. A signal indicating means comprising a housing having a cover, signal controlling means and signal indicating means mounted in said housing, a tell-tale signal means also mounted in said housing and operated by one of said signal indicating means; means for locking said tell-tale signal means in operated position in such a manner as not to prevent subsequent operations of said signal indicating means, means for restoring said tell-tale signal means to the non-operated position, and means for fastening said cover to said housing so as to prevent unauthorized restoring of said tell-tale signal means.

17. A signal indicating means comprising a housing having a cover, a frame in said housing, a semaphore signal means, and a tell-tale signal means mounted on said frame, a transparent means in said cover so positioned that said semaphore signal means and said tell-tale signal means may be observed when said cover is closed; a second transparent means in said cover, a plate having a hole mounted back of said second transparent means, a phrase of words on said plate, an electro-responsive device having an armature mounted on said frame, a shutter attached to said armature and adapted to operate back of said hole in said plate when said cover is closed, a blank face presented by the shutter to said hole when the electro-responsive device is energized, and a word on said shutter in such a position and of such a nature as to appear in said hole when said electro-responsive device is deënergized and change the meaning of the phrase of words on said plate.

18. A signal indicating means comprising a housing having a cover, a frame in said housing, a plurality of electromagnet relays mounted on said frame, circuit controlling contacts mounted on said relays and controlled thereby, a plurality of semaphore operating electro-magnets mounted on said frame, a plurality of electric lamps mounted on said frame, a terminal strip having a plurality of terminals mounted on said frame, and an out of order signal consisting of an electro-responsive device also mounted on said frame, an armature controlled by said electro-responsive device, a shutter attached to and operated by said armature, and a word on said shutter of such a nature as to change the meaning of a phrase of other words when brought into combination therewith.

19. In a low water indicating apparatus, electric circuit closing means controlled by a body of water, a circuit including said circuit closing means, a source of current and a danger signal device, said signal device being adjusted to return to normal position when the connection at said circuit closing means is restored, and a tell-tale device operated by the danger signal device in operation thereof and provided with means for holding it in operated position when the danger signal device is restored to normal position.

20. In a low water indicating apparatus, electrodes adapted to break contact with a body of water when the level thereof falls to a predetermined point, another electrode adapted to break contact with said body of water when the level thereof falls to a point higher than said predetermined point, a circuit including the first named electrodes and a danger signal device, a branch of said circuit including the last named electrodes and one of the other electrodes and also including a cautionary signal device, said signal devices being adapted to return to normal position when the contact at the controlling electrodes is restored, and a tell-tale device operated by the danger signal device on operation of the latter, and provided with means for holding it in operated position when the danger signal device returns to normal position.

21. A signal indicating means comprising a housing having a cover, a frame in said housing having mounted thereon a plurality of signal controlling electro-magnet relays, a plurality of signal indicating means, a terminal strip having a plurality of terminals, and an out of order signal means electrically connected in series with said electro-magnet relays and said signal indicating means, and with terminals on said terminal strip.

22. A signal indicating means comprising a housing having a cover, a frame in said housing, a plurality of transparent means in said cover, a plurality of signal indicating means mounted on said frame in such a position as to be observed through said transparent means when said cover is closed, a plurality of colored light transmitting means in said cover, a plurality of shades mounted on said frame, electric lamps mounted within said shades, and each of said shades being so positioned on the frame that it will engage a corresponding color transmitting means in said cover when said cover is closed.

23. A signal indicating means comprising a housing having a cover, a frame in said housing having mounted thereon a plurality of signal controlling electro-magnet relays, a plurality of signal indicating means, a plurality of coils in electrical connection with said electro-magnet relays, and a terminal strip having a plurality of terminals, and means for electrically connecting said signal controlling electro-magnet relays, said signal indicating means, said coils, and said terminals, with external wiring means.

24. A signal indicating means comprising a housing having a cover, guide means in said housing, a slide member mounted to slide on said guide means, a frame pivoted to said slide member, signal controlling means and signal indicating means mounted on said frame, coils mounted on said frame and in electrical connection with said signal controlling means, a plurality of terminal means also mounted on said frame, and means for electrically connecting said signal controlling means, said signal indicating means and certain connections of said coils with said terminal means.

25. A signal indicating means comprising a housing having a cover, a frame in said housing, a plurality of signal indicating means mounted on said frame, signal controlling electro-magnet relays mounted on said frame, and a construction wherein the energizing winding of the said electro-magnet relay functions as the low tension primary winding of a transformer, and a high tension secondary winding is wound upon said primary winding and in inductive relation therewith, and non-inductive resistance coils also mounted on said frame and in series connection with said secondary windings.

26. A signal indicating means comprising a housing having a cover, guide means in said housing, a slide member mounted to slide on said guide means, a frame pivoted to said slide member, signal controlling and signal indicating means mounted on said frame, a plurality of terminal means mounted on said frame, an electrically operated audible signal means mounted in said housing, means for electrically connecting said signal controlling means, said signal indicating means, and said audible signal means with said terminal means, and means for electrically connecting said terminal means with external wiring means connecting respectively with a source of current and a circuit controlling means.

27. A signal system including a conducting medium, a series of contacts connected in succession by the conducting medium, a conductor from one side of said source of current having two branches connected respectively to certain of said contacts, an electro-responsive relay in one of said branches having circuit controlling contacts normally open when said electro-responsive relay is energized, a danger signal means rendered active when said relay circuit controlling contacts are closed, a second electro-responsive relay in the other of said branches having a plurality of circuit controlling contacts two of which are normally open when said electro-responsive relay is energized, a caution signal means rendered active when said second relay circuit controlling contacts are closed, a third circuit controlling contact normally closed with one of the other two contacts when said second electro-responsive relay is energized, a safe signal means rendered inactive when said third circuit controlling contact and said other contact are opened, and a conductor extending from a contact intermediate said first named contacts to the other side of said source of current, said electro-responsive relays rendering the signals active one at a time in accordance with the position of the conducting medium relative to the contacts.

28. An electric liquid level signal means comprising a source of current, a conducting medium, a series of contacts connected in succession by the conducting medium, a conductor from one side of said source of current having branches connected respectively to certain of said series contacts, an electro-responsive device in each of said branches, a conductor extending from a contact associated with said source of current, means controlled by one of said electro-responsive devices for operating a plurality of signal means, comprising a visual signal, a pilot signal means including an audible signal, an electrically locking tell-tale signal means; and means controlled by a second of the electro-responsive devices for operating a second plurality of signal means comprising a second visual signal, a second pilot means including a second audible signal, a third signal means operated in coöperation with said second plurality of signal means and operated in opposition to either said first named plurality of signal means and said second plurality of signal means; and said electro-responsive devices rendering their respective signals operative in accordance with the position of the conducting medium relative to their respective contact and the associated contact.

29. A signal indicating means comprising a box having a cover plate adapted to fasten therewith, guide means in said box, a slide member adapted to slide on said guide means, a frame pivoted to said slide member, means for rigidly fastening said frame in said box, an audible signal means mounted in said box, a signal indicating dial plate mounted on the said frame, semaphore arms adapted to operate in front of said dial plate, a plurality of semaphore operating electro-magnets mounted on said frame and back of said dial plate, a plurality of electro-magnet relays mounted on the back of the said frame, a terminal strip having a plurality of terminals mounted on the said frame and between the said electro-magnet relays, a plurality of coils mounted on said frame below one of said semaphore-operating electro-magnets and back of said dial plate, a light bank having a plurality of shades containing electric lights mounted on said frame and below said coils, an electro-responsive device having a signal indicating shutter mounted on said frame and below said light bank, a transparent medium in said cover plate adapted to coöperate with said signal indicating dial plate and said semaphore arms, a second transparent medium in said cover plate including a plate having a phrase of words and adapted to coöperate with said signal indicating shutter when said cover plate is closed, a plurality of colored light transmitting mediums in said cover plate adapted to coöperate with said plurality of shades when said cover plate is closed; and a construction whereby when said cover plate is open the said frame with the signal means mounted thereon may be drawn forward on the slide and guide means and swing outward from said box for ready access thereto, and when said frame is within said box, the signal means thereon will fit compactly in said box, when said cover plate is closed, and properly coöperate therewith.

In testimony whereof I have hereunto subscribed my name this 10th day of September, 1918.

WALTER D. NICKUM.